United States Patent [19]
Khan et al.

[11] Patent Number: 6,088,624
[45] Date of Patent: *Jul. 11, 2000

[54] INDUSTRIAL CONTROLLER WITH FLEXIBLE DATA STRUCTURES

[75] Inventors: Mohammad S. Khan, Mantura; Douglas B. Sumerauer, Mayfield Heights, both of Ohio

[73] Assignee: Rockwell Technologies, LLC, Thousand Oaks, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/762,223

[22] Filed: Dec. 9, 1996

[51] Int. Cl.[7] .................................................. G05B 19/42

[52] U.S. Cl. .................. 700/86; 700/19; 700/24; 700/25

[58] Field of Search ................................ 364/191, 140.02, 364/140.08, 140.07

[56] References Cited

U.S. PATENT DOCUMENTS

| | | | |
|---|---|---|---|
| 5,400,246 | 3/1995 | Wilson et al. | 364/146 |
| 5,675,830 | 10/1997 | Satula | 364/140 |
| 5,880,290 | 3/1999 | Ansari et al. | 395/705 |

*Primary Examiner*—William Grant
*Assistant Examiner*—McDieunal Marc
*Attorney, Agent, or Firm*—John J. Horn; A. M. Gerasimow; Keith M. Baxter

[57] ABSTRACT

An improvement in an industrial controller having a processor with a memory holding an I/O table used for storing inputs and outputs transmitted between the industrial controller and a controlled process, via multiple I/O devices, uses templates associated with each I/O device to define the partitioning of the I/O table for the data. The templates define data types and ordering of data required for the particular I/O device permitting the space in the I/O table to be efficiently and intuitively allocated. The templates also relate physical addresses in the I/O table to program variables used by the control program.

5 Claims, 2 Drawing Sheets

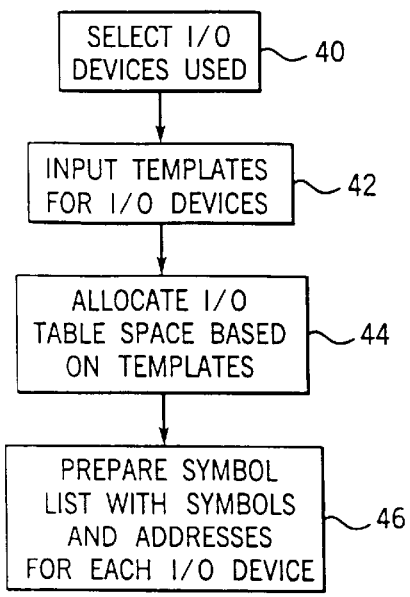
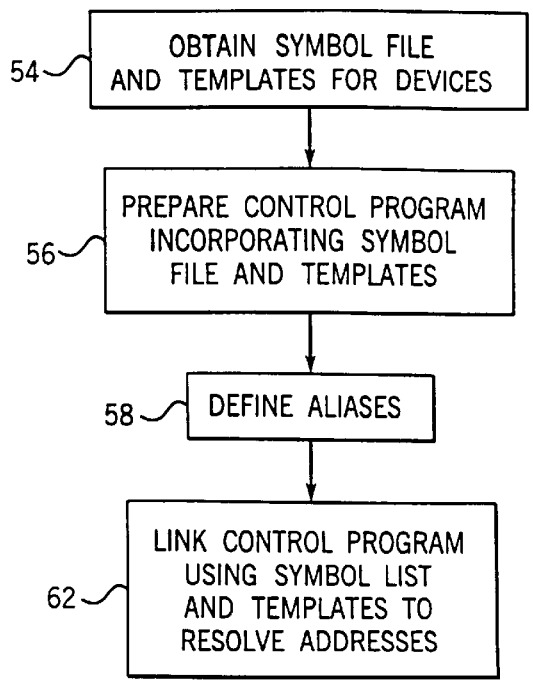
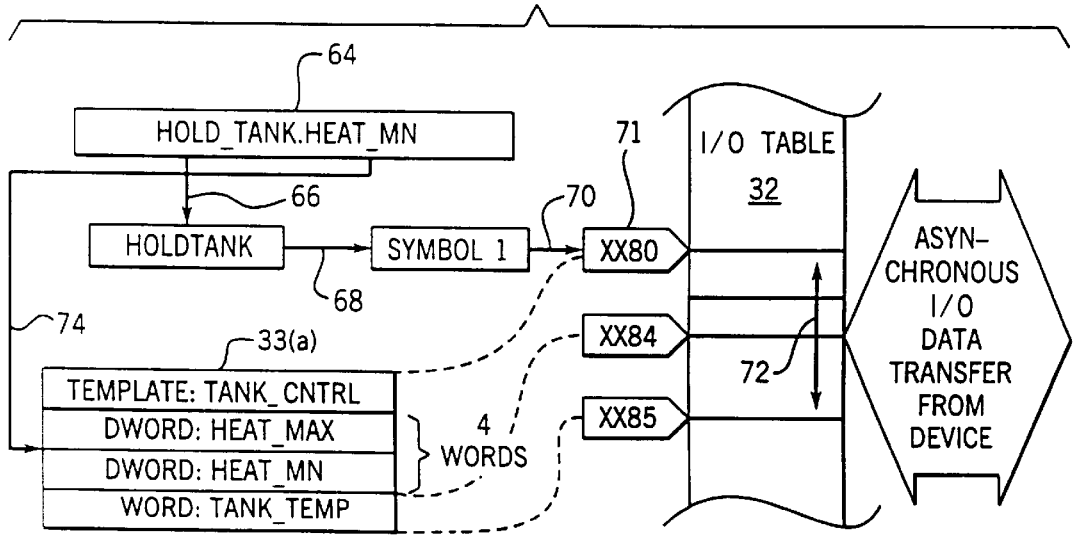

INDUSTRIAL CONTROLLER WITH FLEXIBLE DATA STRUCTURES

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to industrial controllers for controlling industrial processes according to a control program, and in particular to a novel method of coordinating memory assigned to both input/output devices of the controller and variables of the control program.

Industrial controllers are special purpose computers used in controlling industrial processes or manufacturing equipment. Under the direction of a stored control program, the industrial controller examines a series of electrical inputs reflecting the status of the controlled process and changes electrical outputs affecting control of the process. The inputs and outputs may most simply be binary, that is, "on" or "off", however, analog inputs and outputs taking on a continuous range of values are also used.

The various components of the industrial controller may be spatially distributed about a factory or manufacturing facility to be interconnected by one or more communication links. A number of different communication links are commonly used in industrial controllers including proprietary links defined and used by a particular manufacturer and open links such as ControlNet, DeviceNet, and EtherNet whose specifications are published and may be used broadly by a number of manufacturers and suppliers. In such architectures, normally there is a central processor connected with one or more remote input and output modules (I/O devices) connected directly to the controlled process or machine.

The central processor may have in electronic memory an I/O table that receives input data from the I/O devices and stores it at particular addresses in the I/O table and writes output data from the I/O table to the particular I/O devices. This transfer of data between the I/O devices and the I/O table is normally performed by circuitry independent of the processor executing the controlled program. Thus, the processor executing the control program may simply write to or read from the I/O table in order to obtain data relevant to the controlled process. The data is asynchronously refreshed without processor overhead.

It follows from this, that unlike normal computer programs, variables used by the control program cannot be arbitrarily located in memory but need-to be matched with the corresponding I/O table entries. In this way the data of the variables will match the current data of the inputs or outputs on the control devices to which they relate.

In the prior art, this linkage between variables in the control program and data from physical devices was obtained by establishing a fixed relationship between physical devices (or their addresses) and portions of the I/O table. Within the control program, logical names for the variables were restricted to descriptions of the addresses of the physical devices so as to be easily mapped to the corresponding portion of the I/O table. For example, a variable within the control program might be designated by the logical name: RACK 1 SLOT 1, indicating an address for an I/O device denoted by a physical location on a remote I/O rack and a slot within that rack into which the I/O device was inserted.

While this approach is relatively simple it is also inflexible. It requires all future physical devices (that might be connected to the industrial controller) to conform to a predefined physical device space that is pre-mapped to the I/O table. This pre-mapping fixes the amount and structure of the data exchanged with the physical device in a way that may not be appropriate for the requirements of the physical device. The use of logical variable names describing physical device addresses is awkward and non-intuitive for modern programmers. If devices are not present at a particular physical addresses, I/O table space is wasted.

BRIEF SUMMARY OF THE INVENTION

The present invention allows designers of the physical devices for an industrial controller to adopt an arbitrary data structure appropriate to their device, that is having an arbitrary size and divided into arbitrary data types. The designer provides a template indicating the selected data structure that is then incorporated into the control program of the industrial controller. Information in the template is automatically used to allocate the same memory to control program variables and their corresponding physical devices.

Specifically, the method provides for the operation of an industrial controller executing a control program and having memory containing an I/O table storing data used and generated by the control program. The industrial controller has a plurality of connected physical devices exchanging data with the I/O table of the industrial controller. In a first step of the method a template for each physical device is accepted by the industrial controller. The template defines a partitioning of data exchanged between the physical device and the industrial controller, the partitioning being expressed in variables of predetermined types with predetermined order. Based on the template, portions of the I/O table of the industrial controller are allocated to each physical device as required, the portions having a starting physical address in the I/O table. A symbol list of symbols unique to and identifiable to each physical device are then prepared, each symbol being associated with a starting physical address for the device and being associated with a template. A control program using the symbols as variable names may then be compiled replacing the symbols used in the control program with physical addresses deduced from the symbol list and the templates.

It is a general object of the invention to allow manufacturers of control devices used with an industrial controller to select appropriate and intuitive data structures for exchanging data with a centralized I/O table and to provide a mechanism (familiar to programmers) for identifying this data structure or its elements within the control program.

Another object of the invention is to provide coordination between data collection activities by the industrial controller and program execution activities of the industrial controller that also efficiently allocates I/O table memory. Because no fixed relationship exists between physical devices (or their addresses) and physical addresses of the I/O table, there need be no gaps in the allocation of memory.

Yet another object of the invention is to provide complete flexibility in naming variables. The symbol names used in the control program may be provided by the programmer or may be generated automatically and new symbol names used by the programmer through an alias listing.

The foregoing and other objects and advantages of the invention will appear from the following description. In this description, references are made to the accompanying drawings which form a part hereof, in which there are shown by way of illustration a preferred embodiment of the invention. Such embodiment does not necessarily represent the full scope of the invention, however, and reference must be made therefore to the claims interpreting the scope of the invention.

BRIEF DESCRIPTION OF THE SEVERAL VIEWS OF THE DRAWINGS

FIG. 1 is a schematic representation of a control system having a centralized processor and multiple I/O devices each providing a template on a magnetic disk or the like;

FIG. 2 is a flow chart of the steps in configuring the control system of FIG. 1;

FIG. 4 is a flow chart similar to that of FIG. 2 showing the steps of generating a control program for the particular configuration of the control system shown in FIG. 1;

FIG. 5 is a flow diagram showing the resolution of physical addresses from symbols used in the control program per the final step of FIG. 4.

DETAILED DESCRIPTION OF THE INVENTION

Figure 1:
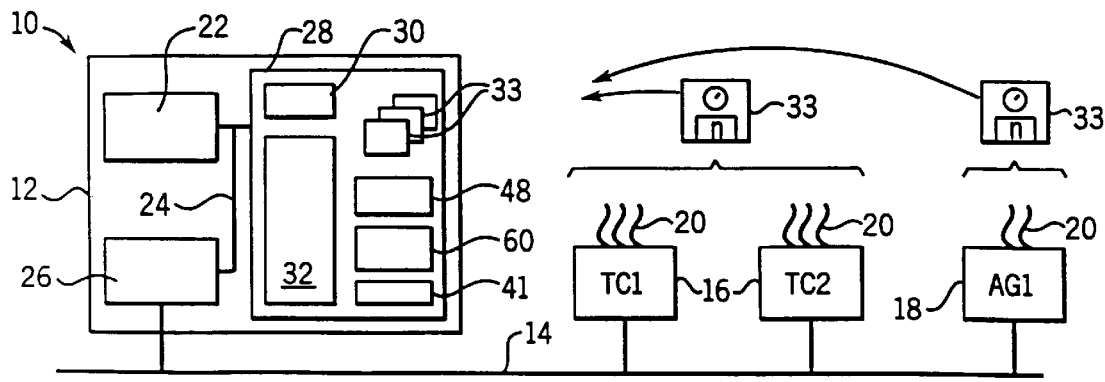

Referring now to FIG. 1, an industrial controller 10 includes a central processor 12 connected via a common communication link 14 to a number of I/O devices 16 and 18. The I/O devices 16 and 18 have connections 20 to a controlled process or a machine and may simply collect data from and transmit data to the machine or may include additional data processing capability, for example, as provided by a PID controller, or the like.

In the present example of FIG. 1, the I/O devices 16 are devices intended for controlling the temperature of tanks of liquid, and as such include basic processing capability for feedback control well understood in the art. I/O device 18 on the other hand may be, for example, a specialized device for agitator control executing low level motor control routines in response to commands from the central processor 12 as will be described further below.

Central processor 12 includes a processing unit 22 connected by an internal bus 24 to an I/O circuit 26 and computer memory 28 well known in the art. According to conventional industrial controller operation, the processing unit 22 executes a control program 30 contained in memory 28. The control program 30 reads input values from an I/O table 32 (also in memory) and writes output values to the I/O table 32 in response to the logic of the control program and the input values. The I/O table 32 is asynchronously, updated with input values transmitted from the I/O devices 16 and 18 and asynchronously transmits output values to the same I/O device 16 and 18.

Generally the control program 30 operates on the data of the I/O table 32 in the manner of a conventional computer program operating on variables. The updating of the exchange of I/O values in table 32 with the I/O devices 16 and 18 is done independently to the execution of the control program by separate circuitry.

It will be understood that it is critical, in this asynchronous updating of the I/O table 32, that the data exchanged with the I/O device 16 and 18 be placed in the I/O table 32 so as to match the locations of the variables used by the control program 30 and intended to correspond to the particular data of the I/O device 16 and 18.

Referring now to FIGS. 1 and 2, this alignment of I/O data exchanged between the central processor 12 and the I/O devices 16 and 18, with the variable data exchanged between the I/O table 32 and the control program 30, is performed using template data 32 (represented generally as disks in FIG. 1) such as will be provided by the manufacturer of the particular I/O devices 16 and 18. This template data will be described further below.

Referring now to FIG. 2, a first step of the construction of the industrial controller 10 is selecting the particular devices 16 and 18 that will be used in the industrial controller 10 and associated with the central processor 12. This selection process is indicated by process block 40 and will be determined by a designer based on the requirements of the particular process or machine being controlled. In the present example, a rather simple controller architecture is used having three I/O devices: two I/O devices 16 controlling tanks in the process and one I/O device 18 controlling an agitator.

At process block 42, the templates 33 for the particular I/O devices selected are input to the central processor 12 or to another programming terminal that may be used off line. As will be discussed further below, the data of the template 33 is unique to a particular I/O device and reflects the manufacturer's judgment as to the necessary variables that are needed to exchange data with the central processor 12 to allow the I/O device to perform its function and the ordering of those variables. The template data also provides names for the particular variables.

Figure 3:
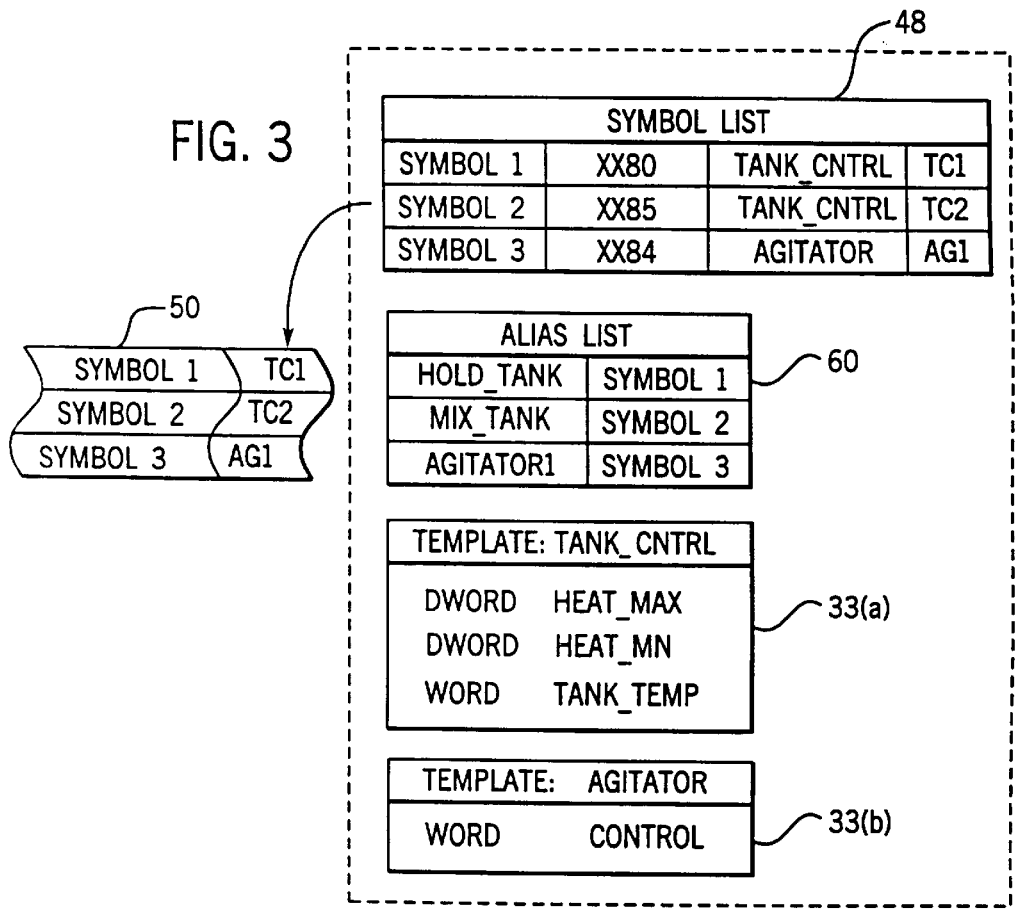
FIG. 3 is a schematic representation of the data structure created during the configuration of FIG. 2 including a symbol file related to the connected devices.

Referring momentarily to FIG. 3, for example, template data 33(a) for the I/O device 16 is a template named TANK_CNTRL and consists of three data elements each designated by a data type and an element name (analogously to a data structure in the C and Pascal computer languages). The first element, in this case, has a data type of DWORD or double word and is given a name, by the manufacturer of HEAT_MAX. This element may, for example, be a command from the central processor 12 as to a maximum temperature desired of the controlled tank's contents.

The remaining elements of the template TANK_CNTRL, include a double word data type designated HEAT_MIN, for example, indicating a minimum temperature that the tank's contents should be regulated to, and a single word data type designated TANK_TEMP which may, for example, be an actual measured tank temperature.

A similar template 33(b) may be used for I/O device 18. This template designated AGITATOR, includes a single element of a word data type designated CONTROL and being, for example, a set of control flags concatenated together in a word. These templates 33 are stored in memory 28 (shown in FIG. 1).

Generally other data types may also be used depending on the particular programming language used by the control program 30. Typical data types include integer floating point, word and double word and Boolean data types.

Referring again to FIGS. 1 and 2, an architecture editor program 41 of the present invention also stored in memory 28 and operating on the central processor 12, or used on a stand alone programming terminal, reviews the data of the templates 33 and a listing of the particular devices 16 and 18 that may be entered by the operator according to the controller configured at step 40, to allocate sufficient space within the I/O table 32 for the data to be exchanged with the particular I/O devices 16 and 18. This is indicated by process block 44. Generally this allocation of memory may be arbitrary, that is without respect to pre-existing relationships between addresses on the link 14 or particular devices 16 and 18 and particular I/O table addresses. Thus the memory of the I/O table 32 may be efficiently utilized with the data from each device 16 located contiguously within the I/O table 32 using only as much space as required.

The amount of space in I/O table 32 needed by each device 16 and 18 is easily determined by reference to the associated templates 33 for these devices and the allocation is performed according to techniques otherwise understood to those of skill in the art. For example, referring to FIG. 3, the amount of memory required by device 16 using template 33(a) is five words readily determined by reviewing the data types of one word and two double-words used by the elements of the template 33(a).

Referring to FIGS. 2 and 3 after allocation of memory to the devices 16 and 18, next at process block 46, a symbol list 48 is prepared defining symbols for the data from the particular I/O devices 16 and 18, and linking each symbol to starting addresses of the memory in I/O table 32 allocated to that device as determined by process block 44.

The symbol list 48, depicted schematically in FIG. 3, includes four columns, the first of which provides an arbitrarily generated symbol name (in this case SYMBOL1-SYMBOL3) that may be used by the control program 30 in designating data exchanged with the particular I/O device 16 and 18. As will be described, an alias list allows these arbitrarily designated symbol names to be replaced by more convenient names by the programmer.

As mentioned, associated with each symbol name is a starting address in the I/O table 32 contained in the second column of the symbol list 48. This starting address is that determined at process block 44 and, as mentioned, may be arbitrary providing, however, that the starting addresses of different symbols are selected so as to provide sufficient room for the data used by the physical device as represented by the symbol. For example, for an I/O table 32 having word addressing, an offset of five words will be required for each device 16.

The third column of the symbol list 48 is a pointer to the particular template 33 for the I/O device 16 or 18 of the symbol.

Finally the fourth column is an identification of the particular I/O device 16 or 18 beyond its generic type and unique for each I/O device 16 and 18. This identification may be a mnemonic designated by the programmer during the selection of the architecture of the industrial controller (at process block 40) or may be, for example, addresses on the link 14 provided they are unique to the particular devices and may be used to identify them.

Looking at the symbol list 48 for the example of FIG. 1, a first symbol named SYMBOL1 is designated having a starting address xx80 in hexadecimal (where the x's indicate unimportant digits for this example). The template for this particular symbol is the TANK_CNTRL template 33(a) as has been described above and the particular device is TC1, standing in this case for "tank controller 1" but as mentioned being any arbitrary but unique identifier of the particular I/O device 16 or 18.

A second symbol, SYMBOL2, has a starting address of xx85 as a result of the five words of data used for SYMBOL1. This symbol also uses the TANK_CNTRL template but relates to the second of I/O devices 16, TC2. Finally, a third symbol, designated SYMBOL3 starts at address xx8A and uses the AGITATOR template and relates to the device AG1 or I/O device 18.

At the time of the generation of the symbol list 48, a symbol file 50 is also created and provided to the programmer of the industrial controller 10. The symbol file 50 may simply be the first and last columns of the symbol list 48 and is used to provide the programmer with a reference of the symbol names that may be used in the control program 30.

Referring now to FIGS. 1 and 4, after the architecture of the industrial controller 10 has been determined per the process blocks of FIG. 2, the control program 30 may be prepared according to techniques generally known in the art. A first step in the generation of this control program 30 indicated at process block 54 is to obtain the symbol file 50 of FIG. 3 and the templates 33 of FIG. 1 for the particular devices 16 and 18. Conveniently these symbol names and templates may be placed in a variable definition section of the control program 30 according to prior art programming practices in languages such as C. In such languages, each variable used in the program and the data structures for structured variables are designated in a particular portion of the program to be used by the compiler. The symbol names and templates 33, therefore, may be directly incorporated into the control program itself for use by the program compiler. The device identifiers (e.g., TC1, AG1) are not incorporated into the control program 30 but serve simply to assist the programmer in identifying particular devices related to the symbols.

At process block 56, the body of the control program may be written according to techniques well known in the art.

As indicated by process block 58 one or more alias's may be established for particular ones of the symbols so as to give the symbols more intuitive names helpful in drafting comprehensible control programs. Referring momentarily to FIG. 3 and to FIG. 4, an alias simply provides an alternative name for a predefined variable. Thus in the example of FIG. 3, SYMBOL1 is given the alias name HOLD_TANK. SYMBOL2 is given the alias name MIX_TANK and SYMBOL3 is given the alias name AGITATOR1. These alias names are arbitrary and are selected to serve simply as mnemonics for the particular devices in the industrial controller 10. An alias list 60, describing the relationship between the symbols and the alias names may be placed in the control program for the compiler.

Referring again to FIG. 4 at a final process block 62, the control program is compiled and linked. At this time the symbols or aliases are resolved to physical addresses within the I/O table 32 as will now be explained. Referring to FIG. 5, the symbol list 48 and the stored templates 33(a) and 33(b) are used to determine a starting address and offset within the I/O table 32. A symbolic reference 64 found in the control program 30, for example, HOLD_TANK.HEAT_MIN (wherein the dot operator'.' designates an element within a structured variable as in C) will be resolved in a two step process.

First the prefix to the symbolic reference 64 (before the '.')is compared against the alias list 60 to determine the underlying symbol for HOLD_TANK as indicated by arrow 66. In this case, the symbol is SYMBOL1 as indicated by arrow 68. The underlying symbol name SYMBOL1 is then applied to the symbol list 48 as indicated by arrow 70 to obtain a starting address of xx80 defining a portion of the I/O table 72 extending from xx80 to xx85 and used to hold relevant data exchanged with the I/O device 16.

During execution of the control program 30, data will be asynchronously transferred between the I/O device and this block 72.

The suffix of symbolic reference 64 (after the '.' Operator) references a particular data element within the structure defined by the symbol HOLD_TANK. That data element is HEAT_MIN and, as indicated by arrow 74, this suffix is applied to the template TANK_CNTRL previously identified in the symbol list 48 at step 68 and 70. In this case, HEAT_MIN is the second entry with the template and thus together with the template's identification of the data types of each element, provides measure of an offset of four words within the structure of the symbol associated with the template 33(*a*). Accordingly four words are added to the base address 71 (i.e., xx80) to obtain an address of xx84 being the location of the double word HEAT_MIN. Accordingly, the symbolic reference 64 HOLD_TANK.HEAT_MIN is replaced in the control program 30 with a physical address xx84 within the I/O table 32.

This process is repeated for each symbolic reference within the control program 30 otherwise using linking techniques understood in the art. Accordingly, during execution of the control program 30, no time need be wasted in resolving addresses from the I/O table. Further, and, unlike a conventional computer linking operation, the particular variables having symbolic addresses in the control program 30 are correctly linked not only to unique and consistent locations within the I/O table 32, but particular locations corresponding to the point of asynchronous data transfer with the relevant I/O device 16 or 18.

The templates therefore offer not only a simple and flexible method for manufacturers of I/O devices 16 and 18 to define the data exchanged with their I/O devices 16 and 18 but form an intuitive interface to programmers developing control programs 30. In particular, the templates correspond to data structures well known in the art and the symbols become variable names within the control program 30.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A method of operating an industrial controller executing a control program and having a memory containing an I/O table storing data used and generated by the control program, the industrial controller further having a plurality of connected I/O devices exchanging data with the I/O table of the industrial controller, the method comprising the steps of:

(a) receiving at the controller software templates associated with each I/O device, each software template defining data elements needed to exchange data between its associated I/O device and the industrial controller, the software template indicating:
        (i) predetermined data types denoting the size of data of the data element and
        (ii) a predetermined order indicating the order in which the data elements will be transmitted to the industrial controller;
    (b) based on the software template, allocating at the industrial controller a portion of the I/O table of the industrial controller to the data elements of each I/O device according to the software template, the portion having a starting physical address in the I/O table and a size determined from the software template;
    (c) preparing a symbol list of symbols unique to and identifiable to each I/O device, each symbol associated by the symbol list with the starting physical address for a data element of the I/O device per the software template; and
    (d) providing symbols of the symbol list to a programmer for preparation of a control program;
    (e) compiling the control program by replacing the symbols used in the control program with the physical addresses deduced from the symbol list.

2. The method of claim 1 wherein the symbols in the control program name a data element of the corresponding software template and wherein the step of compiling the control program computes the offset of the data element within the software template and adds the offset to the starting physical address of the portion of the I/O table related to the software template to determine the physical address of the data element in the I/O table.

3. The method of claim 2 wherein the offset is deduced by examining the data types of the data elements of the software template prior to the data element identified by the symbol and adding known sizes of the data types examined to produce the offset.

4. The method of claim 1 including the step of:

e) executing the control program while concurrently exchanging data between the I/O devices and their allocated portions of the I/O table.

5. The method of claim 1 wherein step (c) includes the step of accepting symbol names from a programmer.

* * * * *